United States Patent [19]

Inoue et al.

[11] Patent Number: 4,645,325
[45] Date of Patent: Feb. 24, 1987

[54] ELECTRONIC INSTRUMENT WHICH SELECTIVELY RECEIVES DIFFERENT KINDS OF BATTERIES

[75] Inventors: Norihiro Inoue, Nara; Shinji Tominaga, Osaka; Masataka Kashima, Toyokawa; Ikushi Nakamura, Sakai, all of Japan

[73] Assignee: Minolta Camera Kabushiki Kaisha, Osaka, Japan

[21] Appl. No.: 740,819

[22] Filed: Jun. 3, 1985

[30] Foreign Application Priority Data

Jun. 4, 1984 [JP] Japan .............................. 59-115202
Jun. 5, 1984 [JP] Japan .............................. 59-115733
Oct. 16, 1984 [JP] Japan .............................. 59-216772

[51] Int. Cl.$^4$ .............................................. G03B 17/00
[52] U.S. Cl. ...................................... 354/484; 307/64; 307/150
[58] Field of Search ................... 354/484; 307/43, 66, 307/80, 64, 150; 320/15

[56] References Cited

U.S. PATENT DOCUMENTS 3,070,748 12/1962 Worobey et al. ..................... 320/15
4,494,854 1/1985 Yamaga et al. ..................... 354/484

Primary Examiner—Michael L. Gellner
Attorney, Agent, or Firm—Watson Cole Grindle & Watson

[57] ABSTRACT

An electronic instrument, such as a camera, which is supplied with electric power from a battery and selectively receives two kinds of batteries which are different from each other in shape and output voltage. A battery chamber of the electronic instrument is constructed to commonly receive the first and second batteries such that a space of the battery chamber is commonly occupied by parts of the first and second batteries. Additionally, a member is projected into the battery chamber and determines which kind of batteries is received. In response to the result of the determination, a voltage converting means converts the output voltage of the battery to a given voltage such that an electonic circuit of the electronic instrument operates with the optimum voltage condition with the voltage supplied from either one of the batteries which are different from each other in shape and output voltage.

22 Claims, 24 Drawing Figures

ELECTRONIC INSTRUMENT WHICH SELECTIVELY RECEIVES DIFFERENT KINDS OF BATTERIES

BACKGROUND OF THE INVENTION

1. Field of the Invention

The present invention relates to a portable electronic instrument such as a camera which is supplied with electric power from a battery and selectively receives different kinds of batteries, and more particularly pertains to such an electronic instrument which selectively recieves two kinds of batteries which are different from each other in their respective shape and/or output voltage.

2. Description of the Prior Art

Several kinds of dry batteries, which are different in shape or in their output characteristics e.g. the open output voltage, the current-carrying capacity or the leakage current, are available in the market for use in portable electronic instruments. For example, batteries for use in cameras include a cylindrical battery cell of the AA type with an open output voltage of 1.5 V, a button shape battery cell of the S-76 type with an open output voltage of 1.5 V, and a packaged battery cell having a package different from the AA and S-76 type batteries in shape and output characteristics. It has been a common practice that a battery which is the most favorable battery for an electronic instrument is determined and selected, upon designing of the instrument from the commercially available batteries in consideration of the operating conditions of the instrument such as the load current of the instrument, the whole weight of the instrument and the life of the battery. Hence, battery chambers of electronic instruments have been designed to accommodate only the selected kind of particular batteries. In other words, other kinds of batteries with a different shape cannot be used.

However, the battery to be used in an instrument may not necessarily be limited to a single kind but the instrument may be designed to selectively receive plural kinds of batteries. Especially, in the case where the particualar kind of battery that is most suitable for the instrument, is expensive and can not be easily obtained in ordinary stores, it will be convenient for the user if the instrument can be used with a conventional battery as a secondary battery which is inexpensive and available in the ordinary stores even if the secondary battery is inferior to the particular battery in efficiency and other properties. Such selective accommodation of different kinds of batteries will enable the user to choose the kind of battery according to a given set of circumstances.

Meanwhile, it sometimes happens that different kinds of batteries are different from each other in their shape and output voltage. However, compactness is a requisite characteristic for the design of a portable electronic instrument such as a camera and the battery chamber of the instrument should be as compact as possible even when batteries of different shapes are to be received in the chamber. Additionally, the components and circuit constants of the circuit of the instrument are generally determined such that the circuit operates in its best condition when it is supplied with electric power from the particular kind of battery. If the secondary battery has a different output voltage from that of the particular battery, the circuit must be designed to adapt for the different output voltages. Otherwise, the circuit operates badly or might be damaged. For example, if the output voltage of the secondary battery is higher than that of the particular battery, the circuit designed to operate with the output voltage of the particular battery may be destroyed by the higher supply voltage. If the output voltage of the secondary battery is lower than that of the particular battery, the circuit may operate badly or may be inoperative due to the lower voltage supply.

SUMMARY OF THE INVENTION

It is an object of the present invention to provide an electronic instrument which selectively receives two kinds of batteries that are different from each other in shape and output voltage.

Another object of the present invention is to provide an electronic instrument which operates in the best condition with the voltage supplied from either one of the batteries which have a difference in their output voltages.

Yet another object of the present invention is to provide an electronic instrument in which the different output voltages of different kinds of batteries are effectively used.

A further object of the present invention is to provide a battery chamber for an electronic instrument which is compact in size and receives two kinds of batteries of different shapes.

Still a further object of the present invention is to provide a battery chamber for an electronic instrument that detects the kinds of battery loaded therein.

An additional object of the present invention is to provide a battery chamber for an electronic instrument which selectively holds different kinds of batteries of different shapes such that the bateries will not jolt therein.

According to the present invention, a battery chamber for an electronic instrument is constructed to commonly receive two kinds of batteries of different shapes such that a part of each battery is received in the same space of the battery chamber. Accordingly, the battery chamber is compact in size. Additionally, a member projecting into the battery chamber determines which kind of battery is received in the battery chamber. In accordance with that determination, the output voltage of the battery loaded in the battery chamber is converted to a voltage at which the circuit of the electronic instrument operates in its best condition, such that the circuit operates in the best condition with the voltage supplied from either one of the batteries which have different shapes and output voltages.

DESCRIPTION OF THE DRAWINGS

3 showing the operating relationship of the battery determination member and associated switch members.

The above and other objects and features of the invention will be apparent from the following description of the disclosure found in the accompanying drawings and the novelty thereof set forth in the appended claims.

DETAILED DESCRIPTION OF THE PREFERRED EMBODIMENT

The following explanation is directed to an embodiment wherein the battery chamber of an electronic instrument according to the present invention is adapted for a photographic camera.

Figure 1:
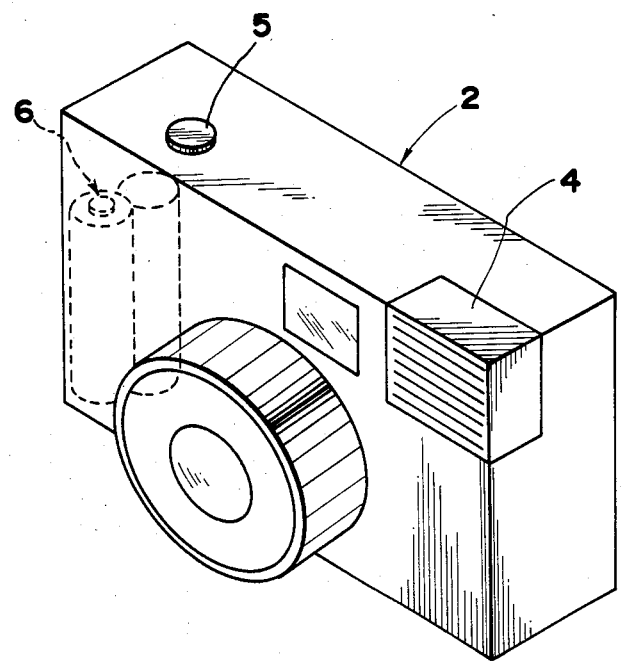
FIG. 1 is a perspective view of a camera as an example of an electronic instrument.

With reference to FIG. 1, camera 2 includes electronic flash device 4. An automatic exposure control device, an automatic focusing device, a film wind-up and rewinding device, a voice indication producing or voice generating device and a data recording or imprinting device are included in the camera but not shown in FIG. 1. Battery chamber 6 is provided on one side of camera 2. Battery chamber 6 is adapted to selectively accommodate two kinds of batteries which are different from each other in their output voltage and shape. As one of such two kinds of batteries, battery chamber 6 may receive a pair of manganese or alkaline-manganese battery cells of the AA type with an open output voltage of 1.5 V. The battery cells may be loaded one-by-one and supported independently of each other. Other kinds of batteries may be included in a package of battery cells which package is different from the AA type battery in shape and which produces an open output voltage of e.g., for example, 6.0 V. These batteries and battery package may be loaded in the battery chamber with a lid at the bottom of the chamber being opened. The batteries thus loaded supply electric power to various devices and circuits in the camera.

The following explanation concerns an embodiment of the battery chamber according to the present invention, with reference to FIGS. 2A, 2B through 5A, 5B, 5C and 5D. Battery package 10 shown in FIG. 2A of a first of battery includes a pair of lithium battery cells with open output voltage of e.g. 3.0 V. The battery cells are arranged side-by-side with their electrodes being disposed oppositely and are covered by an insulating outer wall of a synthetic resin material such that the battery cells are packaged integrally as a unit. In package 10, the battery cells are connected in series with each other. Package 10 is provided with positive electrode 10p and negative electrode 10m in the recess at the bottom 10d. The lithium battery cell is larger in diameter and shorter in length in comparison with the well-known AA type cell. As package 10 contains a pair of aforementioned lithium battery cells arranged side-by-side, it is larger in its horizontal cross-sectional area and shorter in height as viewed in the drawing, in comparison with the side-by-side arrangement of a pair of AA type battery cells. One side 10a of battery package 10 is formed substantially flat while the other side 10b is formed with vertical groove 10c so that package 10 has the shape of two integrally coupled semi-cylinders. The second type of battery is composed of well-known AA type cells 8a and 8b shown in FIG. 2B.

Figures 2A, 2B:
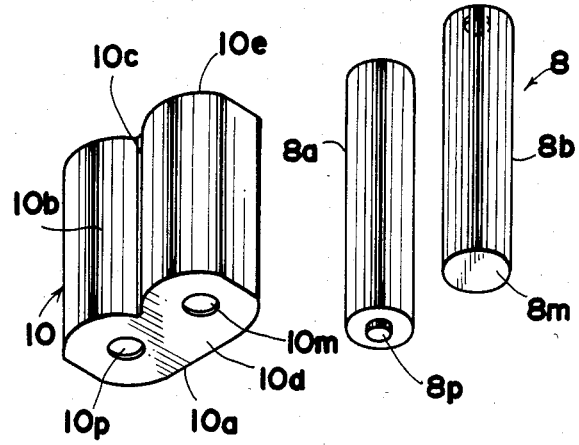
FIGS. 2A and 2B are respective is a perspective views of two kinds of exemplary batteries which are to be received in an electronic instrument of the present invention.
Figure 4:
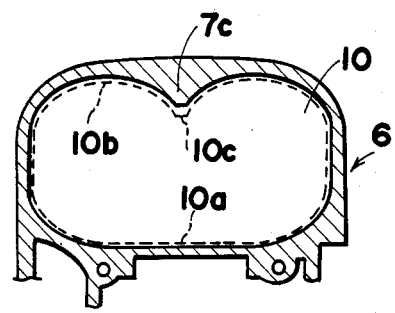
FIG. 4 is a horizontal sectional view of the battery chamber shown in FIG. 3.
Figure 3:
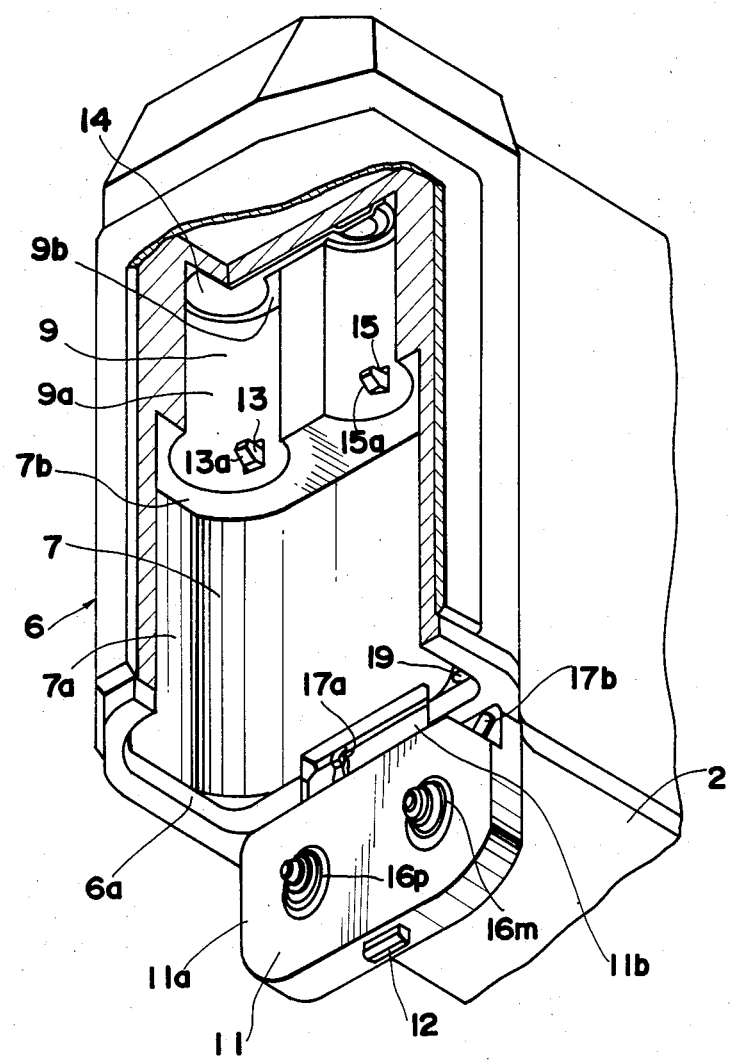
FIG. 3 is a partially sectional view of a battery chamber according to an embodiment of the present invention which selectively receives the two kinds of batteries shown in FIGS. 2A and 2B.

FIG. 3 shows the structure of a battery chamber which selectively receives a single battery package 10 and a pair of AA type batteries 8 as shown in FIG. 2A. It should be noted that FIG. 3 is a partially sectional view of battery chamber 6 as viewed from the bottom of camera 2, i.e., in the direction in which the batteries are inserted.

Battery chamber 6 is composed of lid 11, first receiving portion 7 formed at the rear of opening 6a through which battery cells are put into and out of the chamber, and second receiving portion 9 formed at the rear of first receiving portion 7. First receiving portion is formed with side wall 7a and upper wall 7b for cooperatively enclosing and supporting battery package 10. Side wall 7a is formed, as shown in cross-section in FIG. 4, with a substantially flat plane at one side and with projection 7c which extends vertically. Projection 7c is adapted to engage into groove 10c of battery package 10 as shown in the horizontal cross sectional view of FIG. 4. If battery package 10 is erroneously attempted to be loaded in battery chamber 6 with the electrodes of the package being inverted from the positions shown in FIG. 2a, projection 7c engages flat side 10a of battery package 10 and prevents it from being mistakingly inserted. Second receiving portion 9 is formed with side wall 9a and upper wall 9b for receiving and holding the front ends of AA type batteries 8a and 8b, i.e., the portions of the batteries longer than battery package 10. The relative position of the first and second receiving portions is determined such that electrodes 8m and 8p of AA type batteries 8a and 8b are located substantially at the same positions as those of electrodes 10m and 10p of battery package 10. On upper wall 9a of second receiving portion 9, connecting piece 14 is provided for serially connecting two AA type batteries 8a and 8b at the electrodes opposite from electrodes 8p and 8m. Detecting pins 13 and 15 are provided on side wall 9a of second receiving portion 9 for detecting the loading of an AA type battery. Detecting pins 13 and 15 are connected with movable contacts S7a and S6a (FIGS. 5A, 5C and 5B, 5D, respectively) of switches S7 and S6 (FIG. 6) at one of their respective ends such that their other ends are urged to project into the interior of second receiving portion 9. The other ends of detecting pins 13 and 15 are formed with slanted plane 13a and 15a which engage the top of the cylindrical portion of the AA type batteries when the batteries are inserted into second receiving portion 9 such that detecting pins 13 and 15 are pushed back to change over switches S6 and S7 as will be described in detail later with respect to FIGS. 5A-5D. At the same time, the spring force of the movable contacts presses the AA type batteries against the opposite side wall of second receiving portion 9 to prevent jolting of the batteries within the battery chamber.

Lid 11 is adapted to cover opening 6a of battery chamber 6 is and hinged to camera 2 to turn between open and closed positions. Projection 12 is formed on the edge of lid 11 for restraining lid 11 at its closed position. Contact springs 16m and 16p are provided on inner wall 11a of lid 11 and are adapted to be in contact with electrodes 10m and 10p of battery package 10 and electrodes 8m and 8p of AA type batteries 8a and 8b. In other words, contact springs 16m and 16p selectively and commonly come into contact with both pairs of electrodes 10m and 10p and 8m and 8p. Contact spring 16p is directly connected with positive power source terminal 18 of the camera circuit shown in FIG. 6 (a terminal of the camera circuit to be connected with positive electrode of the battery power source) through lead wire 17a arranged in the vicinity of hinge 11b for lid 11. Contact spring 16m is connected with contact 17b which is provided on the inner wall of lid 11. Negative power source terminal 19 of the camera circuit (the terminal of the camera circuit to be connected with the negative electrode of the power source battery) is provided on the bottom wall of the battery receptacle body, at the position opposite to contact 17b.

With this structure, contact 17b is brought into contact with the negative power source terminal 19 of the camera circuit only when lid 11 is closed. Terminal 19 and contact 17b compose a switch mechanism which electrically disconnects the camera circuit from the batteries with lid 11 being open and connects the camera circuit with the batteries with lid 11 being closed. This structure protects the camera circuit from the breakage due to misoperation of the camera operator as follows. That is, as the contacts for the batteries are provided on the inner wall of lid 11, it is possible that electrodes 10m and 10p of battery package 10 are brought into contact, and electrically connected, with contact springs 16m and 16p with lid 11 being at the open position and battery package being outside of the battery chamber. In this case aforementioned projection 7c projecting into battery chamber 6 for preventing the package from being loaded improperly, does not operate and the electrodes of the battery package can be easily connected oppositely with contact springs. Thus, if the camera circuit is directly connected with the batteries not through the above mentioned switch mechanism, it is likely to occur that the camera circuit will be damaged by the power supply of the opposite polarity. In view of this, the switch mechanism is provided for disconnecting the camera circuit from the batteries and to protect the camera circuit from damage due to such misoperation while lid 11 is open.

Another countermeasure is possible for the protection of the camera circuit from damage. Between the contacts on lid 11 and the power source terminals of the circuit of the electrically operated instrument, e.g., a camera, a normally open switch may be provided which has a movable contact adapted to move in response to the opening and closing of lid 11 in such a manner that the switch is closed with the lid being closed, and opened with the lid being open. This operation can be attained by an insulating member which is provided on the movable contact of the normally open switch and which is arranged to project in the path of lid 11.

Figure 5A:
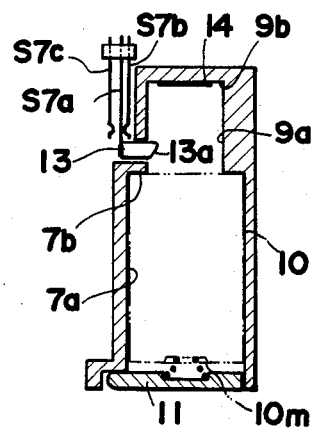
FIGS. 5A and 5C are cross-sectional views of the left-hand portion of the battery chamber shown in FIG.
Figure 5B:
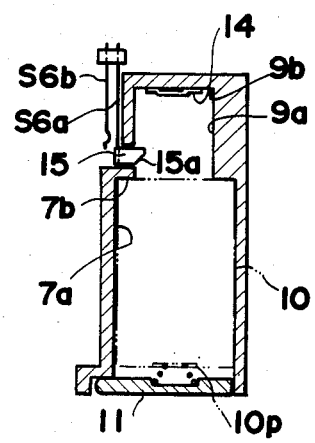
FIGS. 5B and 5D are cross-sectional views of the right-hand portion of the battery chamber shown in FIG. 3 showing the operating relationship of the battery determination member and associated switch members.
Figure 5C:
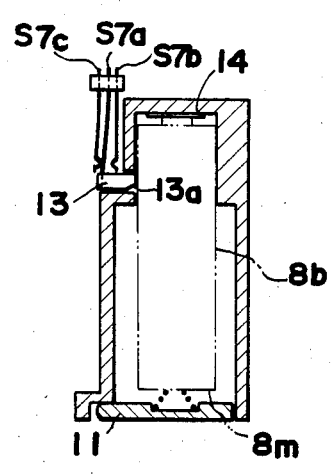
Figure 5D:
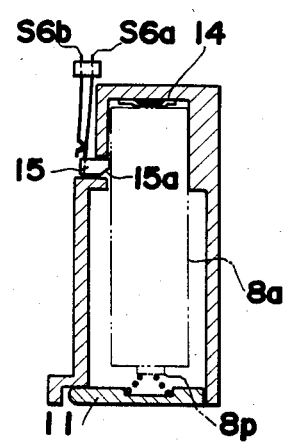

As shown in FIGS. 5A-5D, switch 6 has movable contact S6a and fixed contact S6b, and switch S7 has movable contact S7a and fixed contacts S7b and S7c arranged on both sides of movable contacts S7a. Movable contacts S6a and S7a are biased to the right such that switch S6 is normally open, and change-over switch S7 is normally connected with fixed contact S7c as shown in FIGS. 5(A) and 5(B), respectively. This condition is accomplished when battery package 10 is loaded in first receiving portion 7 to supply a high voltage of 6 V across the power source terminals of the camera. When AA type batteries are loaded in second receiving portion 9, detecting pins 13 and 15 are pushed away to the left to close switch S6 and connect switch S7 with contact S7b as shown in FIGS. 5(C) and 5(D), respectively. With this condition, a low voltage of 3 V is supplied across the power source terminals of the camera.

Figure 6:
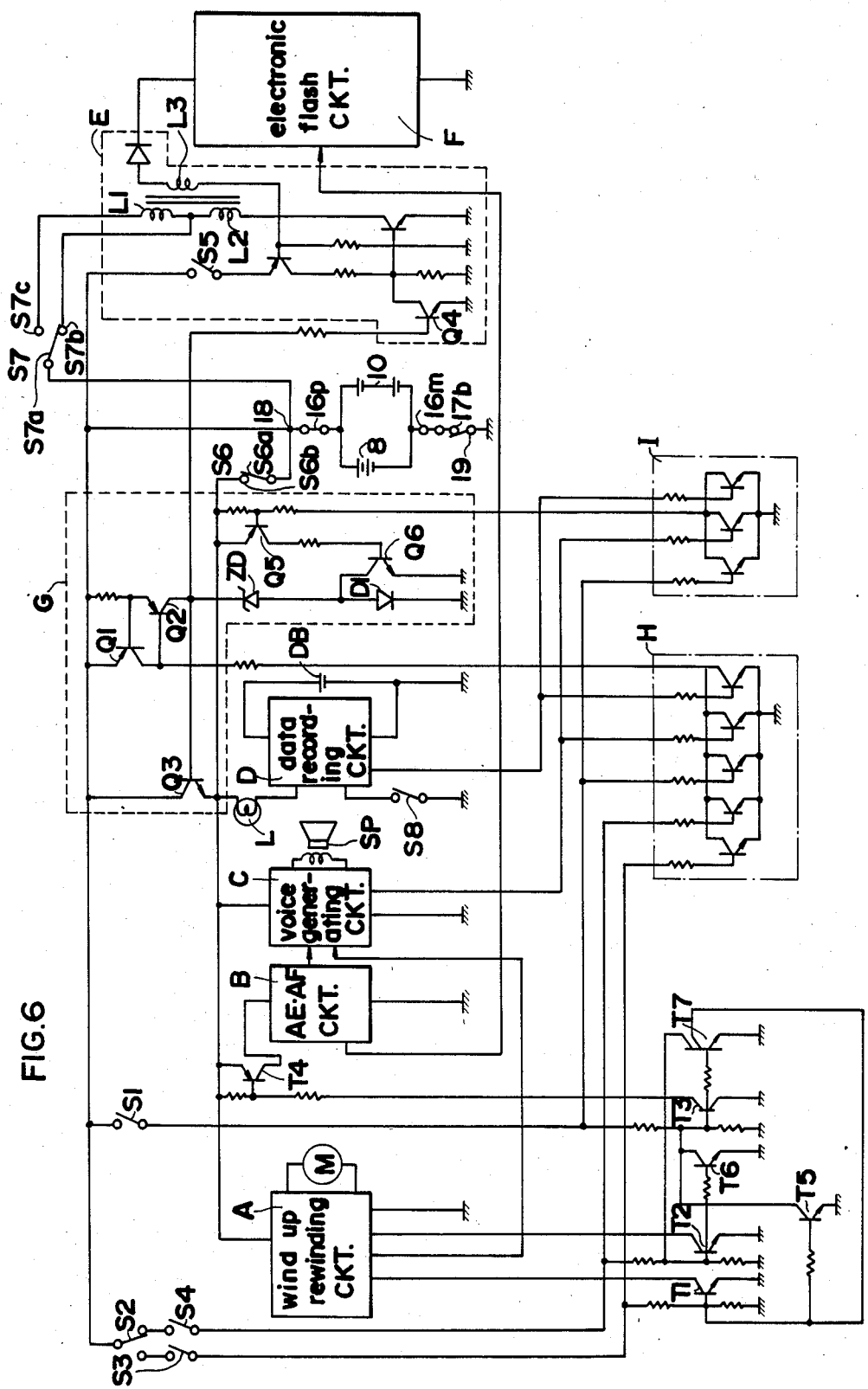
FIG. 6 is a schematic block diagram of one form of electronic circuit of the electronic instrument of the present invention.

FIG. 6 shows an exemplary camera circuit which is supplied with power from the two kinds of batteries described, supra. In this Figure, battery package 10 generates an output of 6 V while AA type batteries 8 generate an output of 3 V. It should be noted that although the Figure shows as if both kinds of batteries are loaded in the camera, only one of them is actually loaded. When AA type batteries 8 are loaded, switch S6 is closed as described earlier so that the output of AA type batteries 8 is directly applied to the circuit on the left side in the Figure. Thus, switch S7 is connected to contact S7b so that voltage booster circuit E for electronic flash circuit F operates at the lower power source voltage. When battery package 10 is loaded instead of AA type batteries 8, switch S6 will open as described before so that the output voltage of battery package 10 is reduced by voltage reducing circuit G and applied to the various circuits on the left side of the Figure. Thus, switch S7 has been changed over to contact S7c so that voltage booster circuit E operates at the higher power source voltage.

As described earlier, camera 2 includes automatic exposure control and focusing circuit B, DC-DC converter or voltage booster circuit E, electronic flash circuit F, film wind-up and rewinding circuit A, voice generator or voice indication producing circuit C, data recording or data imprinting circuit D and voltage reducing circuit G for reducing the output voltage of the battery package. Voltage booster circuit E includes primary coils L1 and L2 and secondary coil L3. Primary coils L1 and L2 are wound in the same direction and serially connected with each other. Fixed contact S7b of switch S7 is connected between primary coils L1 and L2, while fixed contact S7c is connected with the free end terminal of primary coil L1. Accordingly, when battery package 10 is loaded in battery chamber 6 with switch S7 being connected to contact S7b, electric power is supplied through coils L1 and L2 such that the output voltage of battery package 10 is raised to about N3/(N1+N2) times the original voltage. When AA type batteries 8 are loaded with switch S7 being connected to contact S7c, the electric power is supplied through coil L2 and the output voltage of the batteries is raised to about N3/N2 times the original voltage. The characters N1, N2 and N3 represent the numbers of turns of coils L1, L2 and L3, respectively. Switch S5 is manually closed for flash photography to actuate voltage booster circuit E. Transistor Q4 for the control of the voltage boosting or raising operation is rendered conductive to stop the operation of voltage booster circuit E when voltage reducing circuit G operates and circuits A, B, C and D are supplied with electric current. Electronic flash circuit F is supplied with electric power from secondary coil L3 of voltage booster circuit E and effects flash light emission with the charge of a main capacitor not shown in the Figure.

Wind-up and rewinding circuit A includes switch S2 for the selection of the wind-up and rewinding operation, wind-up control switch S3 which is closed in response to termination of exposure and opened upon completion of film wind-up, and film detecting switch S4 which is located in a predetermined position along the path of the film within the camera body, for example, in the vicinity of the camera sprocket wheel such that switch S4 is closed with a film located at that position and is open with no film positioned there. Transistors T1 and T2 are connected with those switches such that transistor T1 conducts in response to the change-over of switch S2 to the wind-up operation side and closure of switch S3 and such that transistor T2 conducts in response to the change-over of switch S2 to the rewinding operation side and closure of switch S4. With this circuit arrangement, wind-up and rewinding driving circuit A drives motor M in a normal direction with transistor T1 being conductive and in the reverse direction with transistor T2 being conductive. A wind-up and rewinding mechanism (not shown) in camera 2 performs a wind-up operation with motor M driven in the normal direction and a rewinding operation with motor M driven in the reverse direction.

Automatic exposure control and focusing circuit B includes switch S1 which is closed in response to depression of shutter release button 5 (see FIG. 1), and transistors T3 and T4 which conduct in response to the closure of switch S1. Circuit B performs an automatic exposure control and focusing operation with transistor T4 being conductive. In the case where the brightness of an object to be photographed is lower than a predetermined level, circuit B supplies a flash firing signal to electronic flash circuit F and fires the latter when the diaphragm aperture reaches a value commensurate with an automatically detected camera-to-object distance.

Transistor T5 is conductive with wind-up and rewinding circuit A being in the wind-up state and transistor T6 is conductive with circuit A being in the rewinding state to prevent the conductive of transistor T3 and prevent the operation of circuit B. When switch S1 is closed to actuate circuit B, transistor T7 conducts to prevent conduction of transistors T1 and T2 and prevent the wind-up and rewinding operation of motor M. Voice indication producing circuit C receives signals from automatic exposure control and focusing circuit B, wind-up and rewinding driving circuit A and produces through speaker SP voice indications such as "load film", "change the camera-to-object distance," and so on.

Data recording or data imprinting circuit D includes an LCD (liquid crystal display) device for displaying date and time data supplied from an electronic clock device (not shown), battery cell DB for driving such devices, lamp L for the exposure of imprinted data, and imprinting initiation switch S8 which is closed, just before the film exposure, in response to operation of a camera mechanism, e.g., an automatic focusing device, to energize lamp L.

Voltage reducing circuit G is adapted to lower the high voltage from battery package 10 and includes zener diode ZD, diode D1 and transistor Q6 for short-circuiting diode D1. When transistor Q6 is blocked, the output voltage of battery package 10 is reduced by voltage reducing circuit G to a first reduced voltage, e.g., 4.0 V which is determined by zener diode ZD and diode D1. When transistor Q6 is conductive, diode D is short-circuited thereby and the output voltage of battery package 10 is reduced to a second reduced voltage, e.g., 3.0 V which is determined by zener diode Z.D. Both first and second reduced voltages are output from the emitter of transistor Q3. In this way, reduced voltage generating circuit G is arranged to generate two different voltage levels so that automatic exposure control and focusing circuit B, voice generating circuit C and data imprinting circuit D are driven by the second reduced voltage which is approximately equal to the output voltage of AA type batteries, while wind-up and rewinding circuit A is driven by the first reduced voltage which is higher than the second.

Voltage reducing control circuit H is provided with five transistors having collectors and emitters parallelly connected with one another and the collectors connected through resistor to voltage reducing circuit G, i.e., the node between the collector of transistor Q1 and the base of transistor Q2. The bases of the five transistors are respectively connected to switches S1, S3 and S4, voice generating circuit C and data imprinting circuit D. Accordingly, when any one of circuits A, B, C and D is in operation, a corresponding transistor in voltage reducing control circuit H becomes conductive to actuate voltage reducing circuit G.

Reducing voltage control circuit I controls voltage reducing circuit G and determines which one of two levels of reduced voltages is to be generated from voltage reducing circuit G. Reduced voltage control circuit I includes three transistors having their collectors and emitters connected in parallel with each other, with the collectors connected to the base of transistor Q5. The bases of those three transistors are respectively connected to switch S1, voice generating circuit C and data imprinting circuit D. Accordingly, when any of the circuits B, C and D is in operation, the corresponding transistor is rendered conductive to render transistors Q5 and Q6 conductive and short-circuit diode D1, thereby reducing the voltage to the second reduced voltage. However, when wind-up and rewinding circuit A is in operation, the above mentioned three transistors are all blocked to block transistors Q5 and Q6 so that the voltage is reduced to the first reduced voltage which is higher than the second reduced voltage by an amount commensurate with the forward voltage across diode D1.

Finally, the operation of camera 2 will be explained. When shutter release bottom 5 is depressed with switch S2 being connected to the film wind-up operation side and switch S3 being open, switch S1 is closed at the initial stage of the shutter release depression to effect object brightness measurement and camera-to-object distance measurement or focus detection. After the camera objective lens is moved to an in-focus position commensurate with the detected object distance, film exposure is effected with a shutter speed and a diaphragm aperture (or the amount of maximum shutter opening in the case of a diaphragm-shutter mechanism). In case the object brightness is lower than a given level, upon arrival of the diaphragm-shutter aperture at a value commensurate with the detected object distance, circuit B supplies a flash firing signal to electronic flash circuit F to effect flash light emission. When a cycle of photography is completed, switch S3 is closed to effect film wind-up and shutter cocking by circuit A. When the shutter has been cocked and the film has been wound-up for one-frame length, switch S3 opens and the wind-up operation is stopped. When all the frames of the have been exposed, the film strain on the film disables further wind-up of the film and change-over switch S2 to the rewinding operation side. It is to be noted that switch S2 is maintained at the rewinding side by a mechanism (not shown) until rewinding operation is completed. With the change-over of switch S2, motor M in circuit A is driven in the reverse direction and rewinding of the film is effected. When the film has been withdrawn to such an extent that the film does not exist at a certain position along its path, switch S4 opens to stop motor M.

In the above embodiment, the first battery is composed of two lithium battery cells arranged side-by-side in a package with positive and negative electrodes being located on the same side of the package, and the second battery is composed of two AA type manganese or alkaline-manganese battery cells arranged side-by-side with their electrodes, which are not in contact with the contact terminals 16p and 16m, connected with each other through connecting piece 14. The AA type batteries may also be arranged in a package with their electrodes being connected within the package.

Further, in the embodiment just described, the first and second batteries output a different voltage, but batteries having the same output voltages may also be employed.

Figure 7:
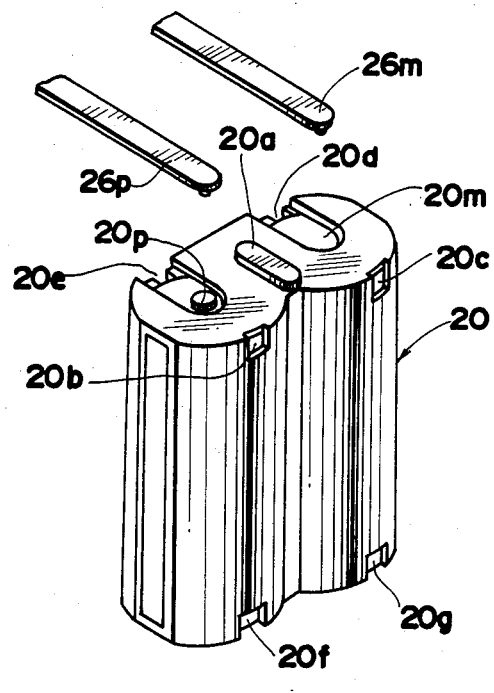
FIG. 7 is a perspective view of another kind of battery.

Next, the second embodiment of the invention will be explained with reference to FIGS. 7 through 15. In this embodiment, the battery package has a similar outer shape to that of two AA type batteries arranged side-by-side as will be described later. With reference to FIG. 7, battery package 20 has a similar construction to that of battery package 10 shown in FIG. 2(A) and includes two lithium battery cells which have respectively an open voltage of 3 V. The battery cells are arranged side-by-side with their electrodes being reversed and covered by an insulating synthetic resin material, thereby being packaged as a unit. Those battery cells are electrically connected in series with each other and positive electrode 20p and negative electrode 20m are exposed on the top plane of battery package 20. The lithium battery cell has a shape that is equal in diameter to and shorter in length than a conventional AA type battery. On the top plane of battery package 20, projection 20a is provided between positive electrode 20p and negative electrode 20m for identifying the battery package from another type of battery.

Figure 8:
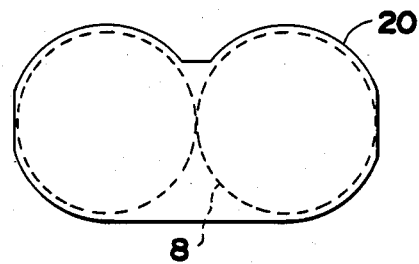
FIG. 8 is a horizontal sectional view of the battery shown in FIG. 7.

As seen in FIG. 8 which shows a cross section of battery package 20 as cut horizontally as vewed in FIG. 7, battery package 20 has a height as viewed in FIG. 8 that is a little longer than the diameter of the AA type battery. The width of the package is approximately equal to double that of the diameter of the AA type battery. The battery chamber of the camera body has an internal size that substantially fits battery package 20. Accordingly, when a pair of AA type batteries are loaded side-by-side in the chamber, the batteries will jolt therein. To cope with this, the battery chamber is formed at appropriate positions on its inner wall, with projections which engage and support AA type batteries to prevent the jolting of the batteries. Battery package 20 is formed with recesses at positions where the recesses are brought into alignment with the projections when a battery package has been loaded. In this way, the projections do not interfere with the insertion of the battery package. With reference to FIG. 7, battery package 20 is formed with recesses 20b, 20c, 20d, 20e, 20f and 20g for that purpose.

Figure 9:
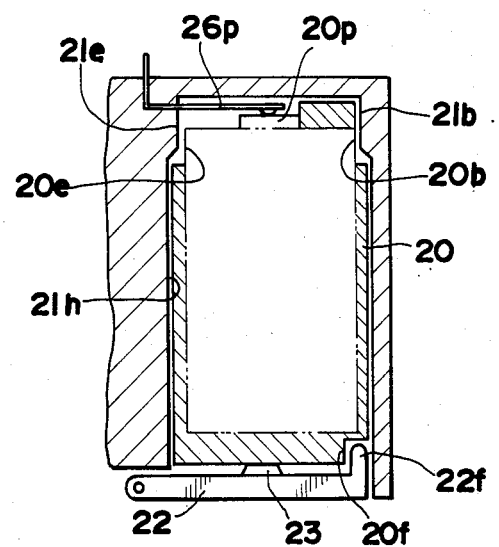
FIG. 9 and FIG. 10 are respective longitudinal sectional views of a battery chamber which receive the battery shown in FIG. 7.
Figure 10:
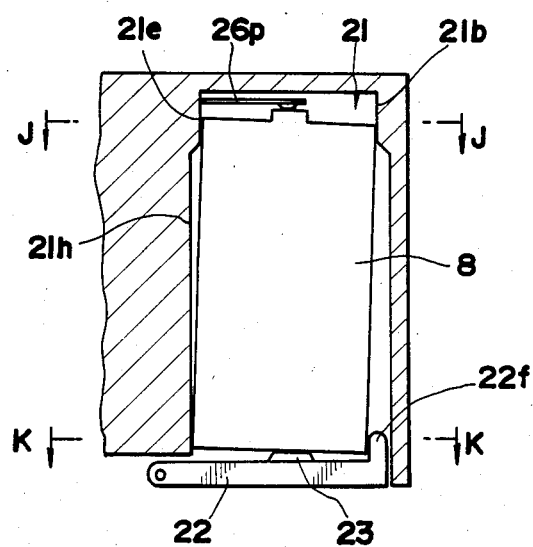
Figure 11:
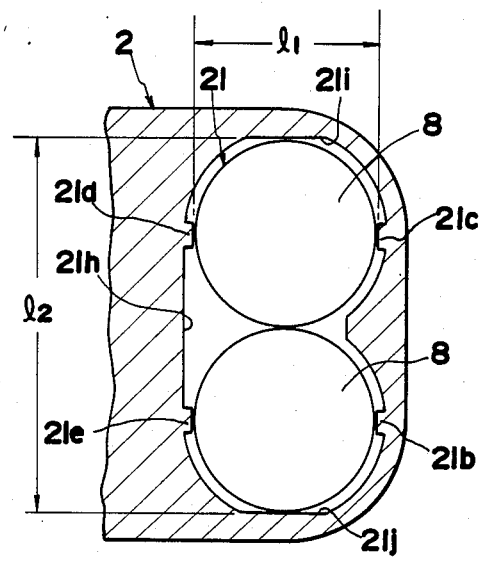
FIG. 11 and FIG. 12 are respective horizontal sectional views of the battery chamber respectively taken on line J—J and K—K in FIG. 10.
Figure 12:
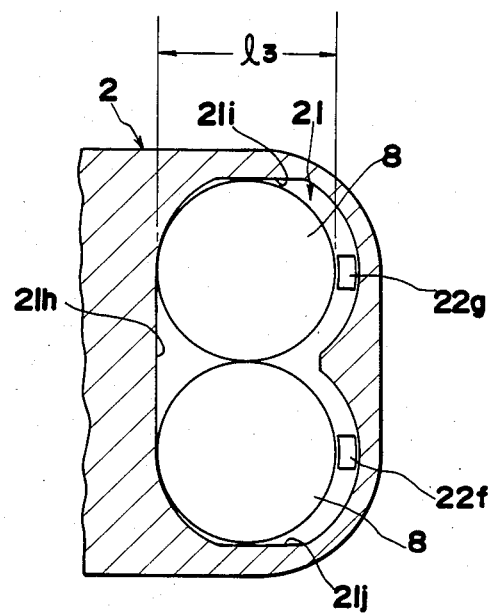

FIGS. 9 through 12 show the battery chamber of camera 2, FIGS. 9 and 10 are vertical sectional views of battery chamber 21, respectively, in the case where it contains battery package 20 and in the case it contains AA type batteries. FIGS. 11 and 12 are horizontal sectional views of battery chamber 21 respectively taken along lines J—J and K—K in FIG. 10. With reference to FIG. 11, on the upper portion of inner wall of battery chamber 21 are formed projections 21b, 21c, 21d and 21e which are to engage into recesses 20b, 20c and 20e of battery package 20, respectively. The distance l1 between the ends of opposing projections is approximately equal to the outer diameter of an AA type battery as shown in FIG. 10 and those projections support the upper portions of AA type batteries. The width l2 of battery chamber 21 is substantially equal to the width of battery package 20 and the sum of the diameters of two side-by-side arranged AA type batteries. The cross section of battery chamber 21 is formed in substanitally the same cross-sectional view as that of battery package 21.

Figure 13:
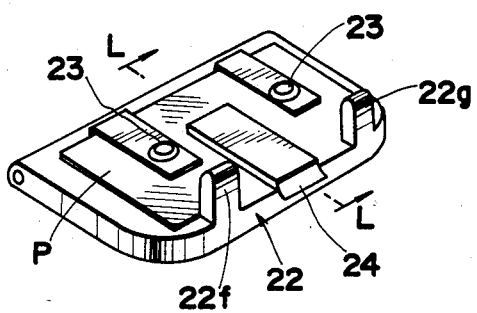
FIG. 13 is a perspective view of the lid shown in FIG. 9.
Figure 14:
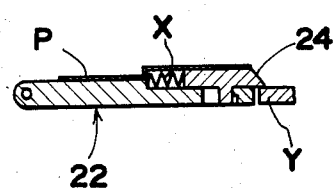
FIG. 14 is a longitudinal sectional view of the lid taken on line L—L in FIG. 13.

FIGS. 13 and 14 show exemplary structures of lid 22 of battery chamber 21. Contact piece 23 is made of a piece of electriically conductive folded plate P and serves to serially connect the positive electrode of one battery with the negative electrode of another battery when a pair of AA type batteries are contained in battery chamber 21. Conduction plate P is mounted on the upper plane of lid 22 and serves also as an arresting or detent piece for lock member 24. Projections 22f and 22g are integrally formed on lid 12 to project therefrom and engage recesses 20f and 20g at the lower portion of battery package 20 when lid 22 is closed as shown in FIG. 9. The distance l3 from projections 22f and 22g to the inner wall 21h of the battery chamber 21 is approximately equal to the outer diameter of the AA type battery as shown in FIG. 12. Accordingly, AA type batteries within battery chamber 21 are supported at their upper portions by projections 21b, 21c, 21d and 21e and inner walls 21i and 21j and at their lower portion by projections 22f and 22g of lid 22 and inner walls 21h, 21i, and 21j, so that AA type batteries are inclined as shown in FIG. 10 so as not to jiggle. FIG. 14 is a cross sectional view of lid 22 taken along line L—L in FIG. 13. Lock member 24 engages into the space formed by conductive plate P and the groove on the upper plane of lid 22 and is urged by spring X in the direction to project beyond the end of lid 22. Lock pawl Y is supported on the camera body.

Figure 15:
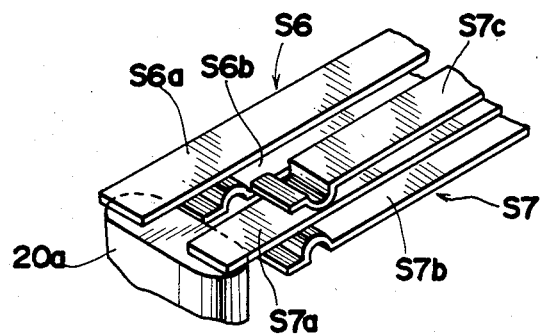
FIG. 15 is a perspective view showing a battery determining means for the battery shown in FIG. 7.

On the upper portion of battery chamber 21, contacts 26p and 26m and change-over switches S6 and S7 are provided. Contacts 26p and 26m are adapted to come into contact with the positive and negative electrodes of AA type batteries 8 or battery package 20 loaded in the chamber. Change-over switch S6 and S7 are adapted to come into engagement with projection 20a on the top plane of battery package 20 as shown in FIG. 15. FIG. 8 additionally shows the cross-sectional contours of the side walls of AA type batteries 8 and battery packages 20 for comparing them. In the Figure, the solid line shows battery package 20 and the broken line shows a pair of AA type batteries arranged side-by-side. As battery package 20 has a protruding outer contour that is a little larger in size than the AA type batteries along the entire periphery thereof, battery package 20 can not fit in a conventional battery chamber that is adapted to receive only the AA type batteries. The protrusion of the entire periphery may be replaced by a plurality of projections provided on the side wall of the battery package. The inner walls of recesses 20b, 20c, 20d, 20e, 20f and 20g shown in the broken line are coincident with or a little smaller than, i.e. retracted from, the contour of AA type batteries.

FIG. 15 shows the structures of switches S6 and S7 and their relative positions to projection 20a of battery package 20. Switch S6 includes movable contact S6a and fixed contact S6b, while switch S7 includes movable contact S7a and fixed contacts S7b and S7c arranged on opposite sides of movable contact S7a. Movable contacts S6a and S7a are urged downward to be respectively in contact with fixed contacts S6b and S7b. In other words, switch S6 is normally closed and switch S7 is normally connected with contact S7b. This condition is attained when a pair of AA type batteries 8 are loaded to supply the camera circuit with a lower source voltage of 3 V. When a battery package 20 is loaded, projection 20a on the top plane of battery package 20 engages and lifts movable contacts S6a and S7a from their under side to open switch S6 and change-over switch S7 to contact S7c. With this condition of switches, the camera circuit is supplied with a higher source voltage of 6 V.

Figure 16:
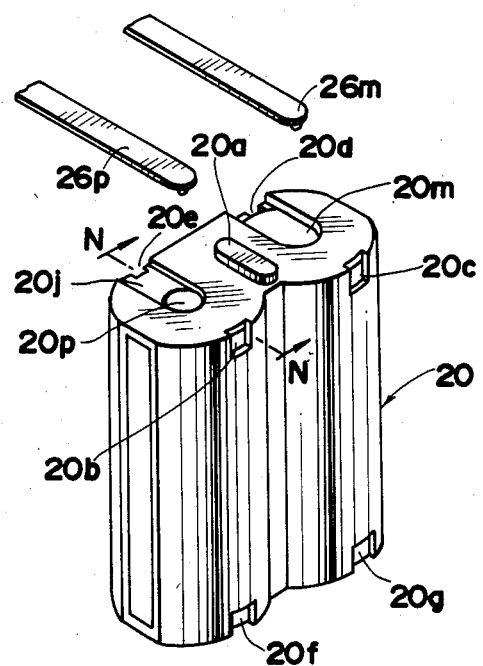
FIG. 16 is a perspective view of a battery similar to FIG. 7.
Figure 17:
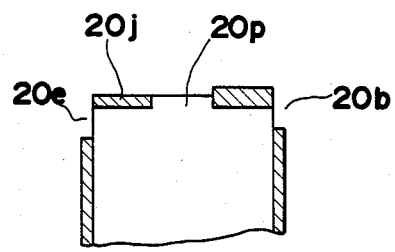
FIG. 17 is a longitudinal sectional view of the battery taken on line N—N in FIG. 16.

FIGS. 16 and 17 show another example of the battery package which differs from battery package 20 shown in FIG. 7 in that the opening for the positive electrode of battery package 20 is defined only for the portion of positive electrode 20p. The remaining portion around the positive electrode is covered with insulating wall. Portion 20j covered with thin insulating outer wall has a guide groove for receiving contact 26p which slidingly engages into the groove to come into contact with positive electrode 20p. Cylindrical batteries are generally formed on their top plane with a positive electrode at the center thereof and a negative electrode all over the top plane except the portion of the positive electrode, with the negative electrode portion being covered with an insulating coating. However, if the coating is broken by its rubbing with the contact piece 26p it is likely that the battery is short-circuited. To cope with this, the top of the package is coated with the upper wall 20j.

Figure 18:
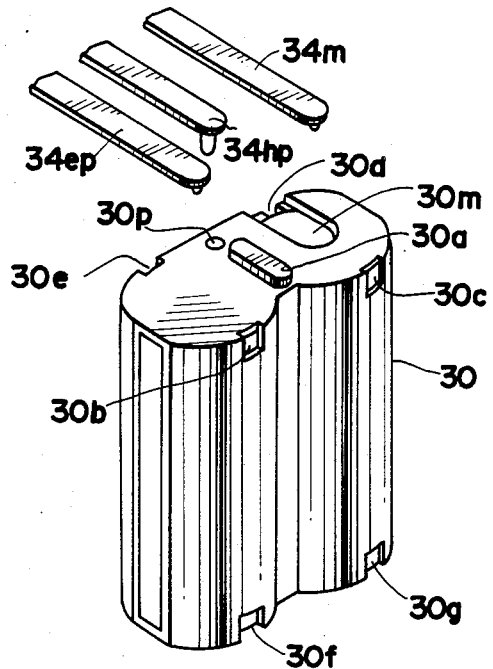
FIG. 18 is a perspective view of still another kind of battery.
Figure 19:
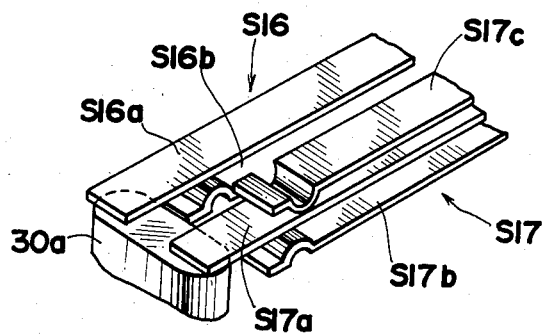
FIG. 19 is a perspective view showing a battery determining means for the battery shown in FIG. 18.
Figure 20:
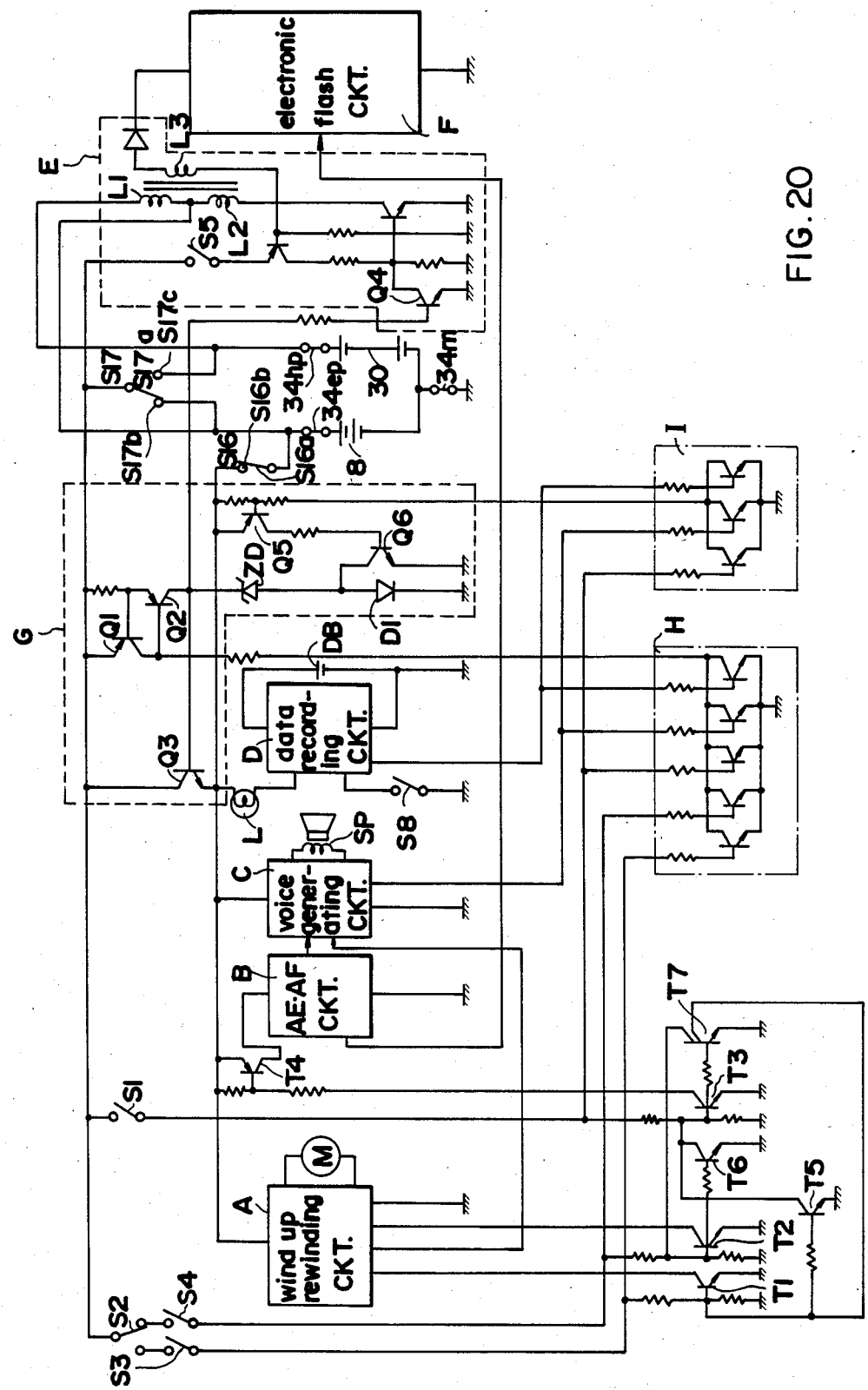
FIG. 20 is a schematic block diagram of another form of electronic circuit of the electronic instrument of the present invention.

FIGS. 18 through 20 show the third embodiment of the battery chamber and the battery package. Package 30 is different from package 20 in FIG. 7, in the location of the positive electrode which is at the center of the top plane of the battery package. The portion where positive electrode 20p is located in the case of battery package 20 in FIG. 7, is covered with an insulating outer wall of a synthetic resin material. The battery chamber is provided at its upper portions with negative electrode contract 34m selectively connectable with both AA type battery 8 and battery package 30 loaded therein, lower voltage positive electrode contact 34ep is connectable only with the positive electrode of an AA type battery, and higher voltage positive electrode contact 34hp is connectable only with positive electrode 30p of battery package 30. The structure of the remaining portions of the battery chamber, lid and battery package are the same as shown in FIGS. 7 through 15.

FIG. 20 shows an exemplary circuit which is supplied with electric power from the battery package of the above embodiment. With reference to FIG. 20, negative electrode contact 34m is grounded. Higher voltage positive electrode contact 34hp is connected to fixed contact S17C of switch 17 and primary coil L1 of voltage booster circuit E. Lower voltage positive electrode contact 34ep is connected to switch S16, the junction between primary coils L1 and L2 of voltage booster circuit E, and fixed contact S17b of switch 17. The construction of the remaining portion of the circuit is the same as that of the circuit shown in FIG. 6. Switches S16 and S17 respectively include movable contacts S16a and S17a and fixed contacts S16b, S17b and S17c. Those switches are located at upper portion of the battery chamber such that the free ends of movable contacts S16a and S17a engage projection 30a on the top plane of battery package 30 as shown in FIG. 19. When AA type batteries 8 are loaded in the battery chamber, movable contacts S16a and S17a of switches S16 and S17 are respectively connected with fixed contacts S16b and S17b. With those connections, the power of AA type batteries 8 is supplied through switch s16 to circuits A, B, C and D and directly to primary coil L2 of voltage booster circuit E. Thus, voltage reducing circuit G does not work because the collector-emitter of transistor Q3 is short-circuited through switches S16 and S17. On the other hand, when battery package 30 is loaded in the battery chamber, movable contacts S16 and S17a of switches S16 and S17 are pushed and moved by projection 30a so that switch S16 is opened and the movable contact S17a of switch S17 disengages from fixed contact S17b and comes into contact with fixed contact S17c. With those changes of connection, the power of battery package 30 is supplied through voltage reducing circuit G to circuit A, B, C and D and directly to primary coils L1 and L2 of voltage booster circuit E.

Obviously many modifications and variations of the present invention are possible in the light of the above teachings. It is therefore to be understood that within the scope of the appended claims the invention may be practiced otherwise than as specifically described.

What is claimed is:

1. An electronic instrument which is supplied with electric power from a battery, said instrument comprising:

a battery chamber for selectively receiving first and second batteries which are different from each other in shape and output voltage, said battery chamber including terminal means for providing the battery power and a space which is commonly occupied by parts of said first and second batteries;

means for determining the presence of said first or second battery received in said battery chamber and generating a signal representing the result of the determination;

an electronic circuit operative at a given supply voltage; and a voltage converting means, connected between said terminal means of said battery chamber and said electronic circuit, for converting the output voltage of the battery to the given voltage in response to said signal.

2. The electronic instrument according to claim 1, wherein said electronic circuit includes a high-power circuit operative at a first supply voltage which is higher than either of the output voltages of said first or second batteries, and said voltage converting means includes a first and second DC-DC converter for respectively converting the output voltages of said first and second batteries to said first voltage and a selecting means for selectively activating said first and second DC—DC converter in response to said signal.

3. The electronic instrument according to claim 1, wherein said electronic circuit includes a low-power circuit operative at a second supply voltage which is equal to the output voltage of said first battery and lower than the output voltage of said second battery, and said voltage converting means includes a voltage reducing circuit for reducing the output voltage of said second battery to said second voltage, and reduction control means operative in response to said signal for activating said voltage reducing circuit with said second battery being received in said battery chamber, and deactivating said voltage reducing circuit and directly supplying the battery power to said electronic circuit with said first battery being received in said battery chamber.

4. The electronic instrument according to claim 3, wherein said electronic circuit further includes a second low-power circuit operative at a third supply voltage which is between the output voltages of said first and second batteries, and said voltage converting means further includes a second voltage reducing circuit connected between said terminal means of said battery chamber and said second low-power circuit for reducing the output voltage of said second battery to said third voltage, said reduction control means including means for activating said second voltage reducing circuit with said second battery being received in said battery chamber and deactivating said second voltage reducing circuit with said first battery being received in said battery chamber.

5. The electronic instrument according to claim 1, wherein said means for determining includes a projection means movable between a projecting position where it projects into said battery chamber, and a retracted position where it is retracted from said battery chamber, said projection means being located at a position where it is engageable with only one of said first and second batteries to be moved from said projecting position to said retracted position.

6. The electronic instrument according to claim 1, wherein said battery chamber includes a first receiving portion for receiving said first battery and a second receiving portion formed as a recess at the bottom of said first receiving portion for receiving said second battery in cooperation with said first receiving portion.

7. The electronic instrument according to claim 6, wherein said terminal means of said battery chamber includes positive and negative power source terminals with which positive and negative electrodes of said first and second batteries respectively commonly come into contact.

8. The electronic instrument according to claim 7, wherein said first battery is a packaged battery of which positive and negative electrodes are provided in the same plane and said second battery includes two battery cells which are arranged side-by-side with respective positive and negative electrodes being disposed at opposite ends of each of said two battery cells.

9. The electronic instrument according to claim 8, wherein said second battery has a cross-sectional area parallel to said electrode plane of said first battery smaller than that of said first battery and a length perpendicular to said battery plane longer than that of said first battery.

10. The electronic instrument according to claim 9, wherein said second receiving portion has a cross-sectional area equal to that of said second battery and a depth equal to the difference between the lengths of said first and second batteries.

11. The electronic instrument according to claim 10, wherein said means for determining includes a projection means movable between a projecting position where it projects into said second receiving portion and a retracted position where it is retracted from said second receiving portion.

12. The electronic instrument according to claim 11, wherein said means for determining further includes means for urging said projection means toward said projecting position.

13. An electronic instrument which is supplied with electric power from a battery, said instrument comprising:

a battery chamber for selectively receiving first and second batteries which are different from each other in shape and output voltage, said battery chamber including terminal means for providing battery power and a space which is commonly occupied by parts of said first and second batteries;

means for determining the presence of said first or second battery received in said battery chamber and generating a signal representing the result of the determination;

an electronic circuit operative at a first supply voltage which is higher than either of the output voltage of said first or second battery;

first and second DC-DC converter means connected between said terminal means of said battery chamber and said electronic circuit for respectively converting the output voltage of said first or second battery to said first supply voltage; and a selecting means for selectively activating said first or second DC-DC converter in response to said signal.

14. The electronic instrument according to claim 13, wherein said instrument includes a camera, said electronic circuit includes an electronic flash circuit, and said first DC-DC converter includes primary and secondary coils, said second DC-DC converter being constructed to commonly use a part of said primary coil and all of said secondary coil of said first DC-DC converter.

15. An electronic instrument which is supplied with electric power from a battery, said instrument comprising:

a battery chamber for selectively receiving first and second batteries which are different from each other in shape and output voltage, said battery chamber including terminal means for providing battery power and a space which is commonly occupied by parts of said first and second batteries;

means for determining the presence of said first or second battery received in said battery chamber and generating a signal representing the result of said determination;

a first circuit operative at a first supply voltage which is equal to the output voltage of said first battery and lower than the output voltage of said second battery;

a second circuit operative at a second supply voltage which is between the output voltages of said first and second batteries;

a first reducing circuit connected between said terminal means of said battery chamber and said first circuit for reducing the output voltage of said second battery to said first supply voltage;

a second reducing circuit connected between said terminal means of said battery chamber and said second circuit for reducing the output voltage of said second battery to said second supply voltage; and a reduction control means operative in response to said signal for activating said first and second reducing circuits with said second battery being received in said battery chamber and deactivating said first and second reducing circuits and directly supplying the battery power to said first circuit with said first battery being received in said battery chamber.

16. The electronic instrument according to claim 15, wherein said instrument includes a camera, said first circuit includes an exposure control circuit and said second circuit includes a film wind-up and rewinding circuit.

17. The electronic instrument according to claim 16, wherein said first circuit further includes a focus detecting circuit.

18. The electronic instrument according to claim 16, wherein said first circuit further includes a data recording circuit.

19. A battery chamber for an electronic instrument which selectively receives first and second batteries which are different from each other in shape, said first battery having a first planar portion provided with both positive and negative electrodes, said second battery having a cross-sectional area parallel to said first planar portion smaller than that of said first battery and a length perpendicular to said first planar portion longer than that of said first battery, and said battery chamber comprising:

a first receiving portion for receiving said first battery, said first receiving portion including a second planar portion confronting said first planar portion;

a contact plate provided at said second planar portion for providing battery power, said contact plate including positive and negative terminals which selectively come into contact with said positive and negative electrodes of said first battery; and a second receiving portion, formed as a recess at an opposite planar portion of said second planar portion of said first receiving portion, for receiving said second battery in cooperation with said first receiving portion, said second receiving portion having a cross-sectional area equal to that of said second battery and a depth equal to the difference between the lengths of said first and second batteries.

20. The battery chamber according to claim 19 further comprising a projection means movable between a projecting position where it projects into said second receiving portion and a retracted position where it is retracted from said second receiving portion, and a means for urging said projection means towards said projecting position.

21. The battery chamber according to claim 20, wherein said first and second batteries generate a respective output voltage which is different from each other, and said instrument further comprising an electronic circuit operative at a given supply voltage, and a voltage converting means connected between said terminals of said contact plate and said electronic circuit for converting the output voltage of the battery to said given supply voltage in response to the movement of said projection means.

22. The battery chamber according to claim 19, wherein said contact plate includes a lid for said battery chamber movable between first and second positions for respectively closing and opening the opening of said battery chamber, and a switch connected between said terminals of said lid and the circuit of said electronic instrument and provided to move in response to the movement of said lid, said switch being closed when said lid is at said first position and being open when said lid is at said second position.

* * * * *